US009624877B2

(12) United States Patent
Weckerle

(10) Patent No.: US 9,624,877 B2
(45) Date of Patent: Apr. 18, 2017

(54) ELONGATED TUBULAR HYDROCARBON ADSORPTION TRAP PRODUCED FROM A CIRCULARLY WRAPPED SHEET MEDIA

(71) Applicant: MANN+HUMMEL GMBH, Ludwigsburg (DE)

(72) Inventor: Rick Weckerle, Kalamazoo, MI (US)

(73) Assignee: MANN+HUMMEL GMBH, Ludwigsburg (DE)

( * ) Notice: Subject to any disclaimer, the term of this patent is extended or adjusted under 35 U.S.C. 154(b) by 76 days.

(21) Appl. No.: 14/542,152

(22) Filed: Nov. 14, 2014

(65) Prior Publication Data

US 2015/0219046 A1 Aug. 6, 2015

Related U.S. Application Data

(60) Provisional application No. 61/904,190, filed on Nov. 14, 2013.

(51) Int. Cl.
*B01D 53/02* (2006.01)
*F02M 25/08* (2006.01)
(Continued)

(52) U.S. Cl.
CPC ..... *F02M 25/0854* (2013.01); *B01D 53/0407* (2013.01); *B01J 20/20* (2013.01); *B01J 20/24* (2013.01); *B01J 20/262* (2013.01); *B01J 20/2803* (2013.01); *B01J 20/2804* (2013.01); *B01J 20/28016* (2013.01); *B01J 20/28042* (2013.01); *B01J 20/3007* (2013.01); *B01J 20/3035* (2013.01); *B01J 20/3078* (2013.01);
(Continued)

(58) Field of Classification Search
CPC ........ B01D 2253/102; B01D 2253/304; B01D 2257/702; B01D 2259/4516; B01D 53/0407; B01J 20/20; B01J 20/24; B01J 20/262; B01J 20/28016; B01J 20/2803; B01J 20/2804; B01J 20/28042; B01J 20/3007; B01J 20/3035; B01J 20/3078; F02M 25/0854; F02M 35/02; F02M 35/0218; F02M 35/042; F02M 35/10281; Y10T 428/13; Y10T 428/1362; Y10T 428/139
See application file for complete search history.

(56) References Cited

U.S. PATENT DOCUMENTS 3,730,158 A * 5/1973 St. Amand ......... F02M 25/0854
123/519
3,990,872 A * 11/1976 Cullen ................... B01D 53/02
206/204

(Continued)

*Primary Examiner* — Christopher P Jones
(74) *Attorney, Agent, or Firm* — James Hasselbeck

(57) ABSTRACT

A tubular hydrocarbon adsorption trap includes a fuel vapor permeable porous media sheet which is circularly wrapped around to form a circumferentially closed elongated tubular body having at least one interior chamber in which the hydrocarbon vapor adsorbent media is arranged. Opposing longitudinal edges of the wrapped media sheet are secured by ultrasonic welding or other means to securely close the circumference of the tubular body. The tubular body is closed on the top and bottom longitudinal edges to retain hydrocarbon vapor adsorbent media within. A method of manufacturing the tubular hydrocarbon adsorption trap is also disclosed.

10 Claims, 9 Drawing Sheets

(51) Int. Cl.
  *F02M 35/02* (2006.01)
  *B01D 53/04* (2006.01)
  *B01J 20/28* (2006.01)
  *B01J 20/20* (2006.01)
  *B01J 20/30* (2006.01)
  *B01J 20/26* (2006.01)
  *B01J 20/24* (2006.01)
  *F02M 35/10* (2006.01)
  *F02M 35/04* (2006.01)

(52) U.S. Cl.
  CPC ........ *F02M 35/02* (2013.01); *F02M 35/0218* (2013.01); *F02M 35/042* (2013.01); *F02M 35/10281* (2013.01); *B01D 2253/102* (2013.01); *B01D 2253/304* (2013.01); *B01D 2257/702* (2013.01); *B01D 2259/4516* (2013.01); *Y10T 428/13* (2015.01); *Y10T 428/139* (2015.01); *Y10T 428/1362* (2015.01)

(56) References Cited

U.S. PATENT DOCUMENTS

| | | | | |
|---|---|---|---|---|
| 4,364,474 A * | 12/1982 | Hollander, Jr. | ........ | B65D 75/48 206/219 |
| 4,401,447 A * | 8/1983 | Huber | ................ | B01D 53/0415 210/282 |
| 4,938,750 A * | 7/1990 | Leise, Jr. | ................ | A61F 5/441 55/385.4 |
| 5,468,447 A * | 11/1995 | Bermas | .................... | A61L 9/01 422/1 |
| 6,155,072 A * | 12/2000 | Sullivan | ............. | B01D 53/0415 62/474 |
| 6,395,074 B1 | 5/2002 | Mastromatteo | | |
| 6,517,614 B1 * | 2/2003 | Klotz | .................... | B29C 65/06 55/385.3 |
| 6,592,655 B2 | 7/2003 | Iriyama et al. | | |
| 6,835,257 B2 * | 12/2004 | Perrine | .................. | B29C 65/08 156/580.2 |
| 6,976,478 B2 | 12/2005 | Kato et al. | | |
| 7,028,673 B2 | 4/2006 | Itou et al. | | |
| 7,182,802 B2 | 2/2007 | Bause et al. | | |
| 7,344,586 B2 * | 3/2008 | Zulauf | .................. | B01D 53/02 95/143 |
| 7,360,530 B2 | 4/2008 | Oda et al. | | |
| 7,473,306 B2 | 1/2009 | Uemura et al. | | |
| 7,501,013 B2 | 3/2009 | Oda | | |
| 7,507,279 B2 | 3/2009 | Mizutani et al. | | |
| 7,608,137 B2 | 10/2009 | Oda | | |
| 7,637,974 B2 | 12/2009 | Scholl et al. | | |
| 7,758,678 B2 | 7/2010 | Yoshida et al. | | |
| 7,811,350 B2 | 10/2010 | Hirata et al. | | |
| 8,082,906 B2 | 12/2011 | Hirata et al. | | |
| 8,205,442 B2 | 6/2012 | Dobert et al. | | |
| 8,979,724 B2 * | 3/2015 | Fowler | .................. | B09B 3/0075 588/249.5 |
| 2002/0170436 A1 * | 11/2002 | Keefer | .................. | B01J 20/183 96/121 |
| 2004/0118747 A1 * | 6/2004 | Cutler | ................ | B01D 53/0415 208/208 R |
| 2005/0279210 A1 * | 12/2005 | Hirata | ................ | B01D 53/0415 96/138 |
| 2007/0022880 A1 * | 2/2007 | Mizutani | ............ | B01D 46/0036 96/136 |
| 2008/0041736 A1 * | 2/2008 | Perrine | ................ | B01D 53/261 206/204 |
| 2009/0301071 A1 * | 12/2009 | Dobert | ............... | B01D 53/0431 60/311 |
| 2010/0192530 A1 * | 8/2010 | Wydeven | ........... | B01D 46/0005 55/488 |
| 2011/0023719 A1 * | 2/2011 | Kidman | ............ | B01D 53/0407 96/136 |
| 2011/0072974 A1 * | 3/2011 | Patel | .................... | B01D 53/02 96/147 |

\* cited by examiner

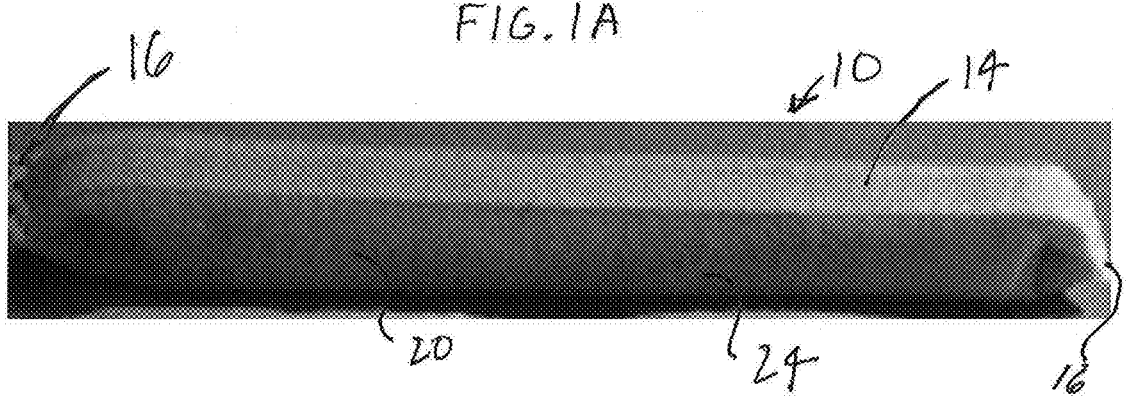
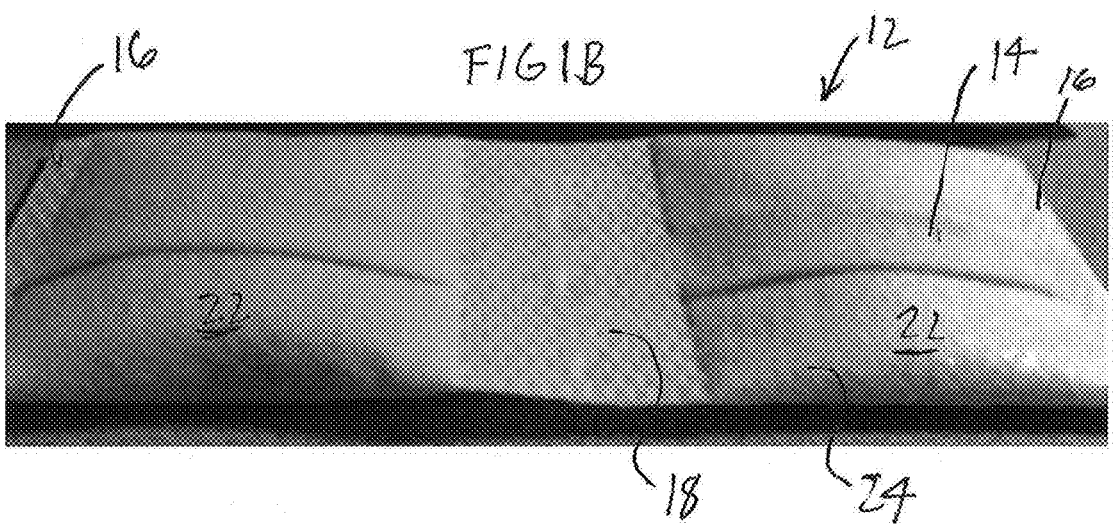

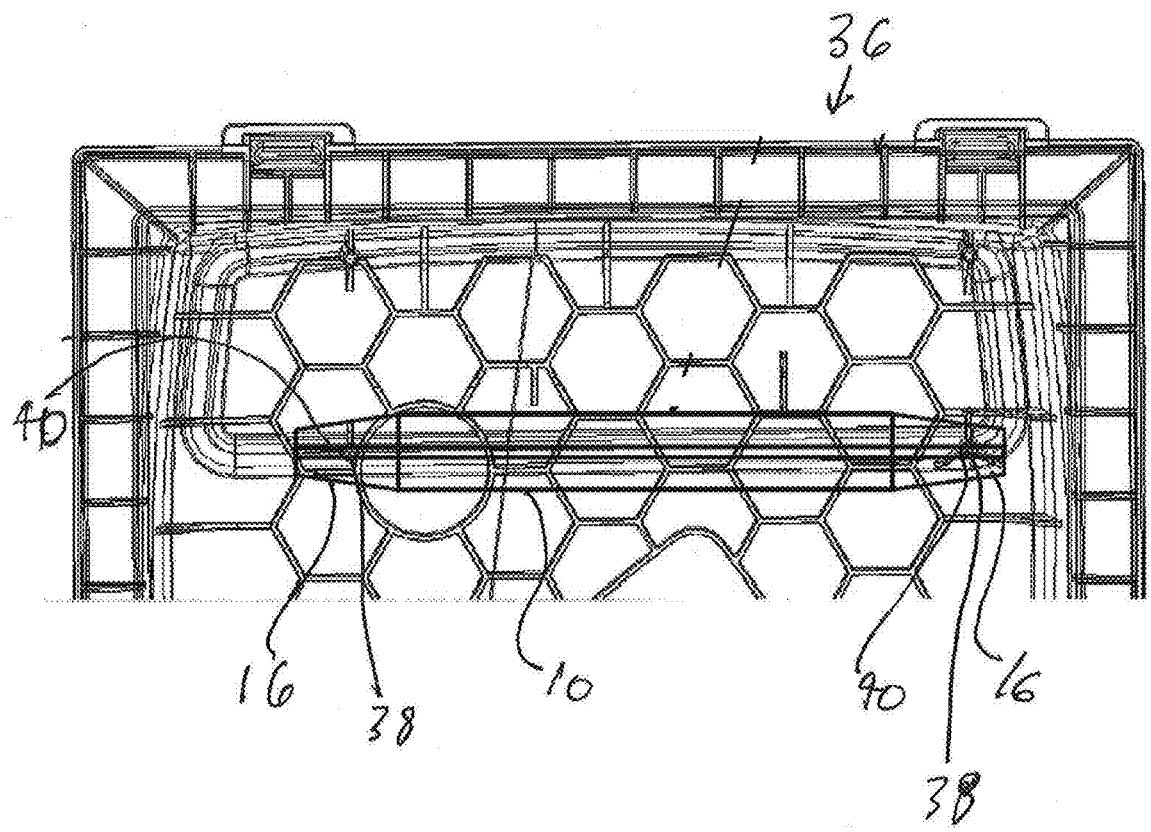

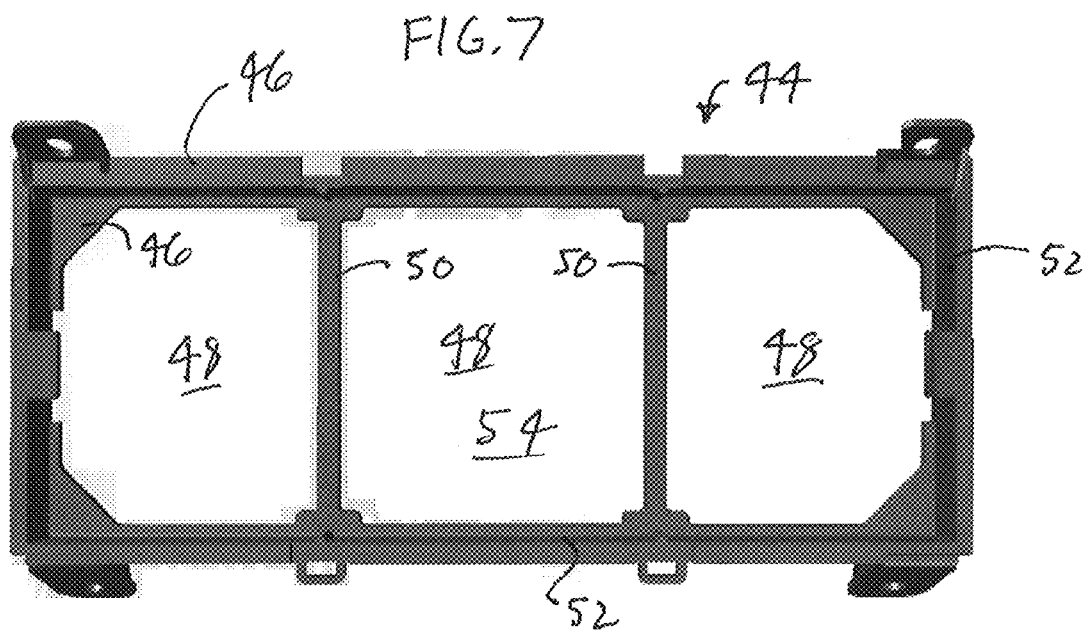
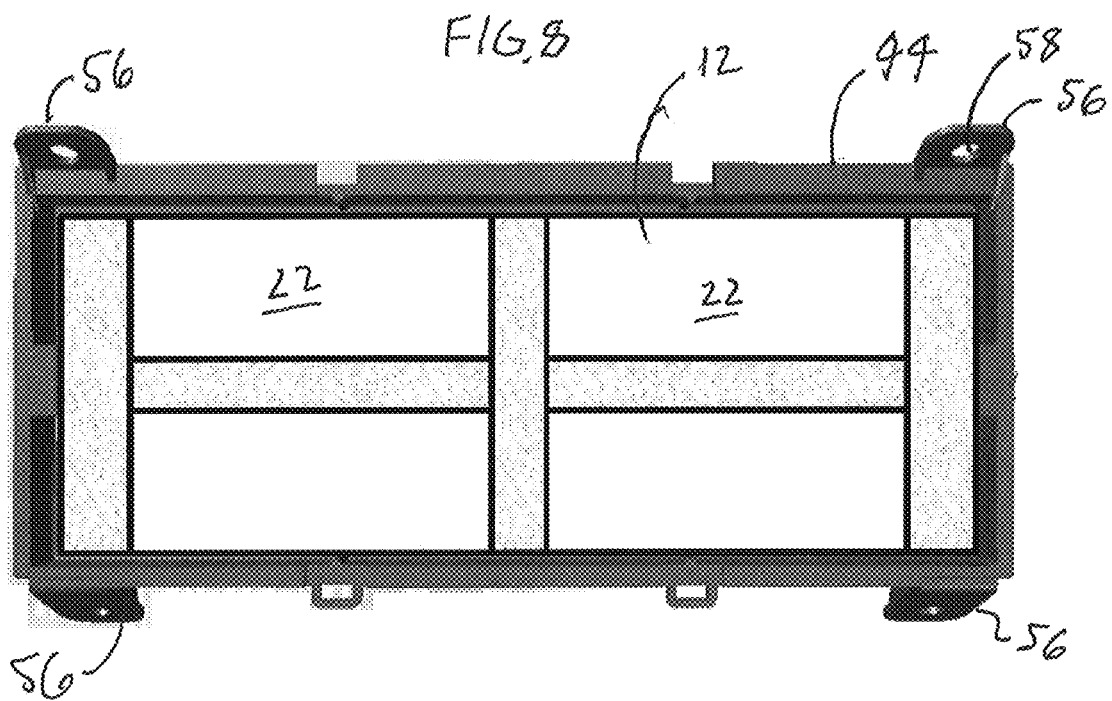

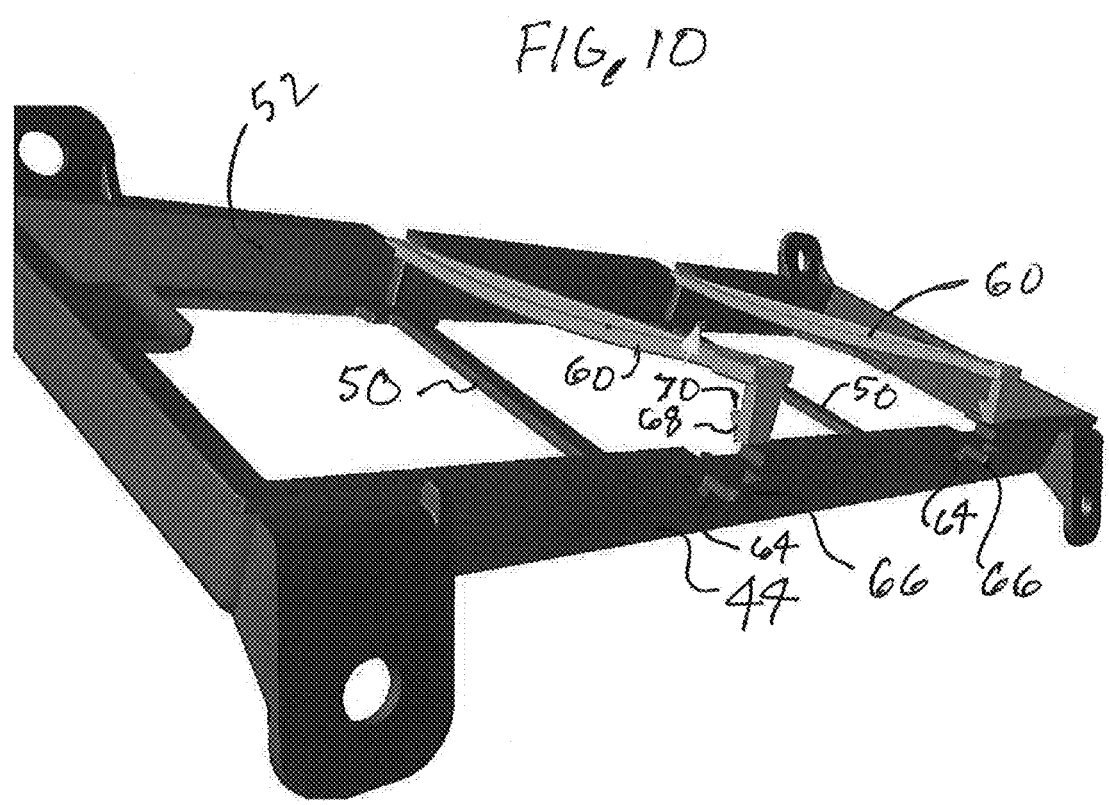

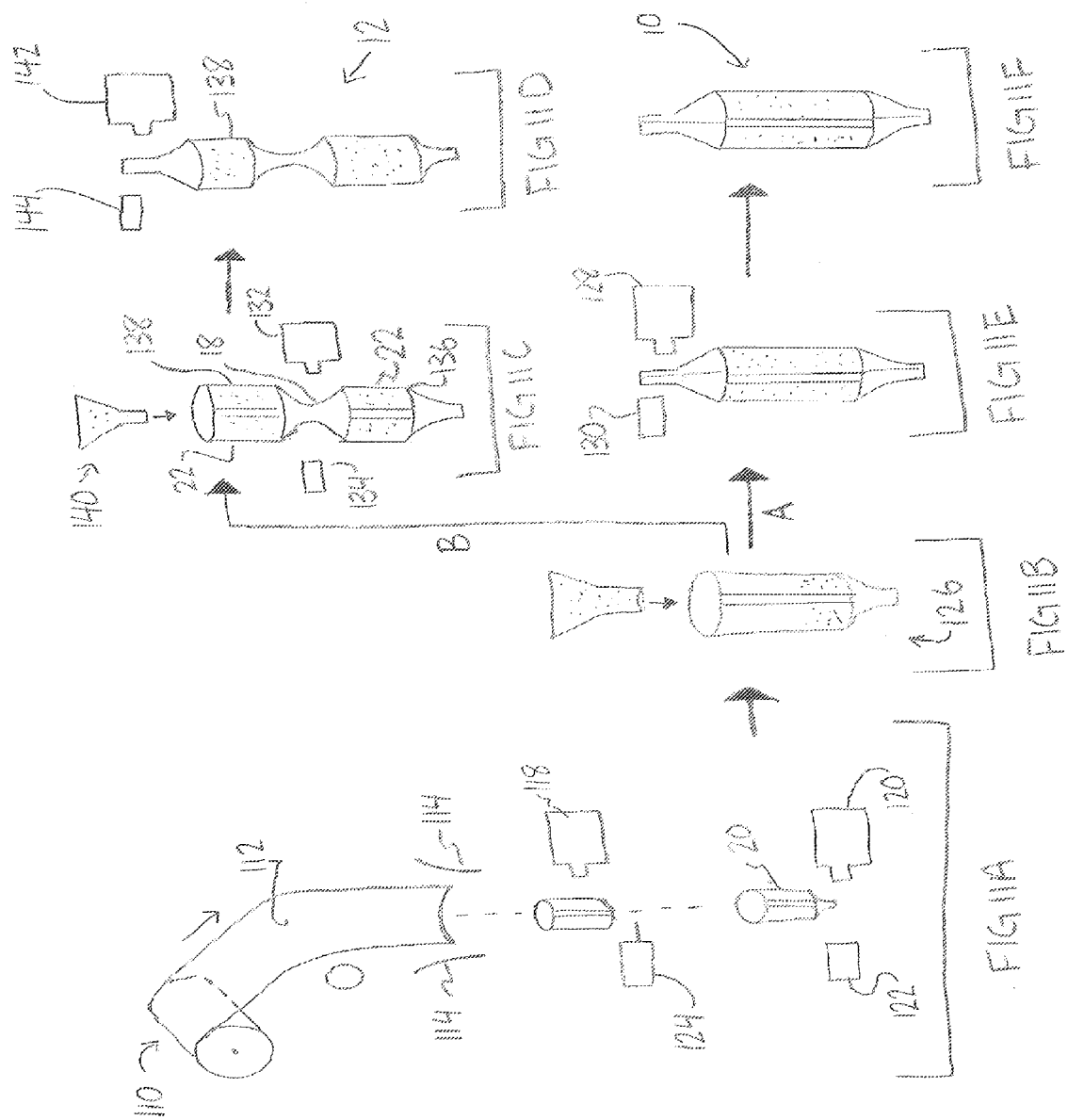

ELONGATED TUBULAR HYDROCARBON ADSORPTION TRAP PRODUCED FROM A CIRCULARLY WRAPPED SHEET MEDIA

CROSS-REFERENCE TO RELATED APPLICATION

This application claims the benefit of U.S. Provisional Application No. 61/904,190, filed Nov. 14, 2013.

TECHNICAL FIELD

The invention relates to air cleaners and air intake systems for internal combustion engines and, more particularly, to devices for trapping hydrocarbon vapors such as fuel vapors in the air intake system when the engine is shut down and then releasing the trapped vapor back into the air intake system when the engine is later operated.

BACKGROUND OF THE INVENTION

It is desirable to trap evaporated fuel and oil vapors within the air intake system, thereby preventing their release into the outside environment. Fuel vapors contain hydrocarbons which are known to be a significant contributing component in urban smog.

Gasoline, for example, is a highly volatile hydrocarbon fuel that includes components which transition easily from a liquid to vapor phase. Elevated temperatures such as occurring during normal internal combustion engine operation accelerate the liquid to vapor transition. The hydrocarbon vapors, unless treated or captured, may ultimately discharge into the atmosphere. It is known that hydrocarbon vapors are discharged from the engine crankcase during engine operation. When the engine is shutdown, these vapors may continue to be released from the hot engine crankcase and other components, particularly as the engine cools.

The control of hydrocarbon vapors escaping into the environment is regulated by state and federal regulations. Hydrocarbon traps for capturing hydrocarbon vapors are well known. For example, motor vehicles are commonly equipped with hydrocarbon adsorptive emissions canisters connected to the fuel tank for trapping hydrocarbon vapors, particularly as emitted during refueling.

It is known that certain porous materials such as activated carbon are useful for absorption and removal of organic hydrocarbon vapors. It is known hydrocarbon vapors are liquefied within small micro pores of the activated carbon and may be retained by absorption.

Various types of hydrocarbon traps for capturing hydrocarbon vapors are known in the art. For example, U.S. Pat. No. 5,914,294 discloses a monolithic trap which adsorbs chemical constituents from a gas stream. This is achieved by bringing the gas into direct contact with the activated carbon in the monolith. One disadvantage of this type of extruded or press formed hydrocarbon trap is that the extrusion and binding process results in a relatively brittle trap that may crack or have individual pieces flake off.

Another example is U.S. Published Application 2005/0223894 which discloses an adsorption element for adsorbing gases and vapors from the intake tract of an engine. The adsorption element has free-flow channels in an element having a spacer layer and an adsorption layer. One disadvantage of this type of corrugated trap is that the trap itself introduces a restriction to airflow in the intake tract.

Another example is in U.S. Pat. No. 8,262,785 which discloses a flat hydrocarbon adsorption traps having a first media retention layer and a second media retention layer in a spaced parallel relationship. The layers are separate sheets between which the hydrocarbon vapor adsorbent media is arranged. One disadvantage of this type of trap in the high cost of production due to the necessity of cutting the first and second media retention sheets to size, applying the hydrocarbon vapor adsorbent media on the first sheet and stacking the second sheet over the first sheet. A mounting member is then secured to the edges of the spaced sheets, the mounting member closing over the sealing the hydrocarbon vapor adsorbent media within the trap. The manufacturing process is relative complex resulting in higher cost. As the manufacturing requires several discrete components assembled in discrete steps, where the size and shape of the components is dependent upon the specific part being produced, the process is suitable of high speed low cost production.

Therefore, there remains a need in the art for a hydrocarbon adsorption trap that is producible from a single roll stock sheet media in a continuous forming process, where the process is adaptable for configurable to manufacture a variety of hydrocarbon adsorption trap for different applications from a single flexible process.

SUMMARY OF THE INVENTION

In various aspects of the invention, an elongated rolled sheet tubular hydrocarbon adsorption trap is provided for adsorption of evaporated fuel vapors within an air intake tract of an internal combustion engine. The elongated rolled sheet tubular hydrocarbon adsorption trap is formed from a circularly wrapped substantially flat sheet of porous media, preferably a polyester, a non-woven polyester or polyester felt. The media sheet may be of one or more layers, with the layers possibly of differing materials. Other porous woven or non-woven or cellulose media sheets may be used to for the porous exterior of the elongated rolled sheet tubular hydrocarbon adsorption trap.

In another aspect of the invention an air cleaner housing is provided having an air inlet port, an air outlet port and defining a chamber therein. A filter element is disposed in the chamber and configured to filter air flowing between the inlet and outlet ports. A tubular hydrocarbon adsorption trap is permanently secured to an interior wall of the air cleaner housing.

The above features and advantages and other features and advantages of the present invention are readily apparent from the following detailed description of the best modes for carrying out the invention when taken in connection with the accompanying drawings.

BRIEF DESCRIPTION OF THE DRAWINGS

The accompanying Figures where like reference numerals refer to identical or functionally similar elements throughout the separate views and which together with the detailed description below are incorporated in and form part of the specification, serve to further illustrate various embodiments and to explain various principles and advantages all in accordance with the present invention.

Features of the present invention, which are believed to be novel, are set forth in the drawings and more particularly in the appended claims. The invention, together with the further objects and advantages thereof, may be best understood with reference to the following description, taken in conjunction with the accompanying drawings. The drawings show a form of the invention that is presently preferred; however, the invention is not limited to the precise arrangement shown in the drawings.

FIGS. 1A and 1B are an exemplary plan views of showing two example variants of the elongated rolled sheet tubular hydrocarbon adsorption trap, consistent with the present invention;

FIG. 5. is a top view into the open interior of the air filter housing cover;

FIG. 7 depicts a plan view of an exemplary frame member;

FIG. 8 depicts a plan view of the exemplary frame member of FIG. 7 with the hydrocarbon adsorption trap of FIGS. 6A, 6B;

FIG. 10. depicts a perspective view of the exemplary frame member of FIG. 7, showing the support members and pivoting support members; and FIGS. 11A-11F depicts a manufacturing process for producing the elongated rolled sheet tubular hydrocarbon adsorption trap.

FIG. 11A schematically depicts a method of wrapping and welding a media sheet to form a circumferentially closed tubular sheet body.

FIG. 11B schematically depicts a method of filling the circumferentially closed tubular sheet body with hydrocarbon adsorption media.

FIG. 11C schematically depicts a method of dividing the circumferentially closed tubular sheet body tubular body into two or more subtraps.

FIG. 11D schematically depicts a method of closing the end of the tubular sheet body tubular body having two or more subtraps to form the hydrocarbon adsorption trap.

FIG. 11E schematically depicts a method of closing the top side of the circumferentially closed tubular sheet body, fixedly enclosing the hydrocarbon adsorption media.

FIG. 11F schematically depicts the elongated rolled sheet tubular hydrocarbon adsorption trap produced by the method.

Figure 2A:
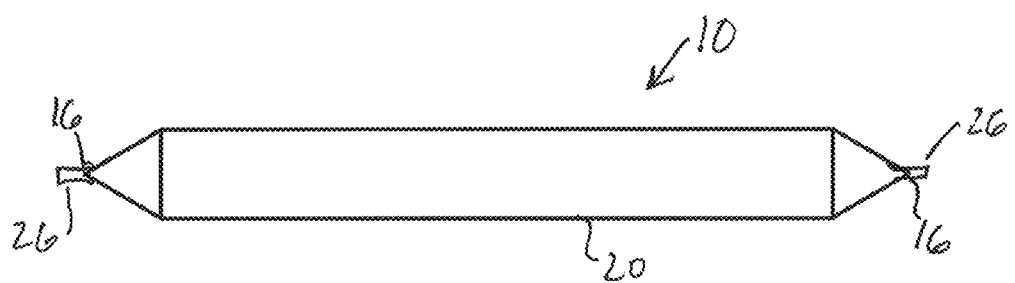
FIG. 2A is a schematic side view of an elongated rolled sheet tubular hydrocarbon adsorption trap of FIG. 1, consistent with the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of apparatus components and method steps related to an elongated rolled sheet tubular hydrocarbon adsorption trap for an engine air intake tract as disclosed herein. Accordingly, the apparatus components may have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

FIGS. 1A and 1B are exemplary plan views of showing two example variants of the elongated circumferentially rolled sheet tubular hydrocarbon adsorption trap, the sheet rolled to form a circumferentially closed tubular body. The tubular hydrocarbon adsorption trap 10 is formed of a thermally weldable sheet of porous media, preferably a synthetic material, a polyester, a non-woven polyester or polyester felt. Other porous woven or non-wovens including cellulose media sheets may alternately be used to for the porous exterior of the elongated rolled sheet tubular hydrocarbon adsorption trap.

The hydrocarbon vapor adsorbent media enclosed within the media sheet is preferably but not necessarily in a granular form. In other aspect of the invention, the hydrocarbon adsorbent granules are bound together by an adhesive, the adhesive maintaining the granules in a desired distribution within the interior of the elongated rolled sheet tubular hydrocarbon adsorption trap.

Opposing longitudinal edges 14 of the media sheet forming the tubular body 20 are secured together, preferably by ultrasonic welding or heat bonding, to close the circumferential perimeter of the tubular body 20. The hydrocarbon vapor adsorbent media enclosed within is preferably activated carbon in granular form.

The tubular hydrocarbon adsorption trap 12 is similar to the tubular hydrocarbon adsorption trap 10, but further including a compressed, welded region 18 dividing the tubular body 20 into two or more subtraps 22. Hydrocarbon vapor adsorbent media (not shown as located inside of the tubular body) is not arranged in the subtraps 22 and generally not present in the dividing top/bottom weld or separating weld 18 between the subtraps. The dividing weld 18 is preferably an ultrasonic or heat bond weld compressing and weldably closing the media sheet 24 such that there is a closed separation or partition provided between the subtraps 22.

As shown in FIGS. 1A and 1B, the compressed bottom/top edge welds 16 and/or the surface of the longitudinal edge weld 14 may be structured in a 3D fashion, such as by embossing or thermal forming, providing, for example, a checkered surface of raised ribs and depressions there between. The structured surface is advantageous as it provide additional rigidity and strength to the compressed bottom/top edge welds 16 and/or the surface of the longitudinal edge weld 14, particularly useful when the compressed welded portion of the media sheet 24 are used as locations for mounting the tubular hydrocarbon adsorption trap 10,12 within an air intake tract duct or air filter housing.

FIG. 2A is a schematic side view of an elongated rolled sheet tubular hydrocarbon adsorption trap 10 (as in FIG. 1), showing formed flat mounting tabs 26 arranged at opposing axial ends of the tubular body 20. The formed flat mounting tabs 26 are preferably formed by compressed bottom/top edge welds 16 as discussed with FIG. 1, but may alternately be provided by an separate formed flat mounting tabs member 26 secured or welded to the compressed bottom/top edge welds 16 of the tubular body 20.

Figure 2B:
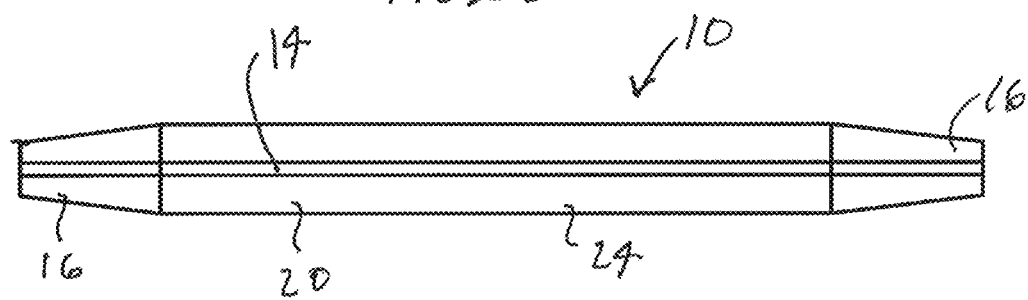
FIG. 2B is a top view of an elongated rolled sheet tubular hydrocarbon adsorption trap (as in FIGS. 1 and 2a)

FIG. 2B is a schematic top view of an elongated rolled sheet tubular hydrocarbon adsorption trap 10 (as in FIGS. 1A, 1B and 2a), showing the longitudinal edge weld 14 on the opposing longitudinal edges of the media sheet 24 of the tubular body 20. Also shown are the compressed bottom/top edge welds 16, which may also be structured for strength as shown and discussed with FIGS. 1A and 1B.

Figure 3:
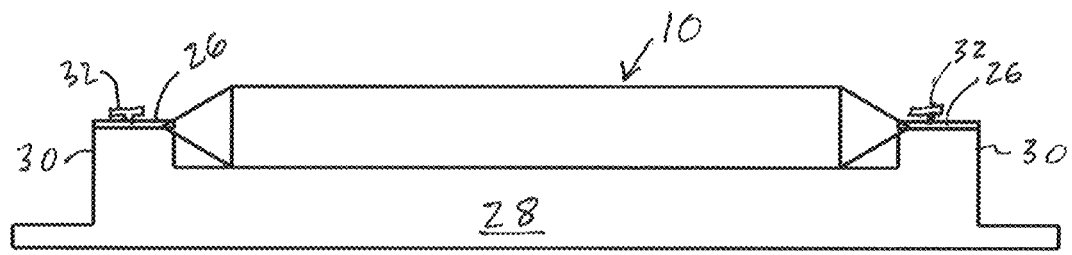
FIG. 3. is a side view of the tubular hydrocarbon adsorption trap secured by its flat mounting tabs members onto an optional mounting base.

FIG. 3. is a schematic side view of the tubular hydrocarbon adsorption trap 10, secured by its flat mounting tabs members 26 onto an optional mounting base, preferably a molded plastic mounting base component 28. As shown in FIG. 3, the flat mounting tabs members 26 may be secured to the raised protrusions 30 of the mounting base component 28 by any suitable means including adhesive, screws or heat stakes 32. Heat stakes 32 may be plastic pins provided on the raised protrusions 30 of the mounting base component 28, the pins extending through a hole provided in the flat mounting tabs members 26, with the head 24 of the heat stake pin thermally softened and mushroomed over the flat mounting tabs members 26 to secured the tubular hydrocarbon adsorption trap 10 onto the mounting base component 28.

Figure 4:
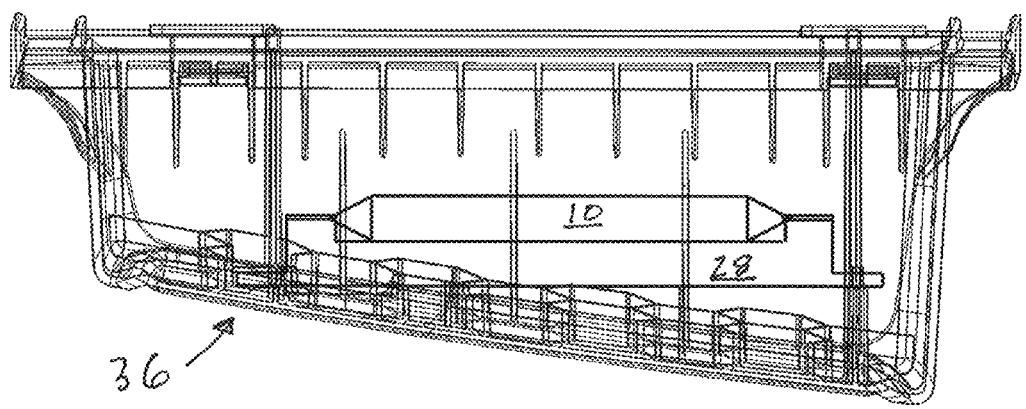
FIG. 4. is a side view sectional view of an air intake system component.

FIG. 4. is a schematic side view sectional view of an air intake system component (example: air filter housing cover 36) showing the tubular hydrocarbon adsorption trap 10 secured onto the mounting base component 28, the assembly secured on the interior of the air filter housing cover 36.

FIG. 5. is a schematic partial top view into the open interior of the air filter housing cover 36 showing another envisioned mounting method for mounting the tubular hydrocarbon adsorption trap 10 within the interior of the air filter housing cover 36. In FIG. 5, the flattened compressed bottom/top edge welds 16 may include one or more bores or through holes 40. The interior of the air filter housing cover 36 may be provided with formed pin protrusions 38 which are spaced and aligned to be received though the bores or through holes 40. The pins may then be thermally softened and mushroomed to mount the tubular hydrocarbon adsorption trap 10 within the interior of the air filter housing cover 36.

Figure 6A:
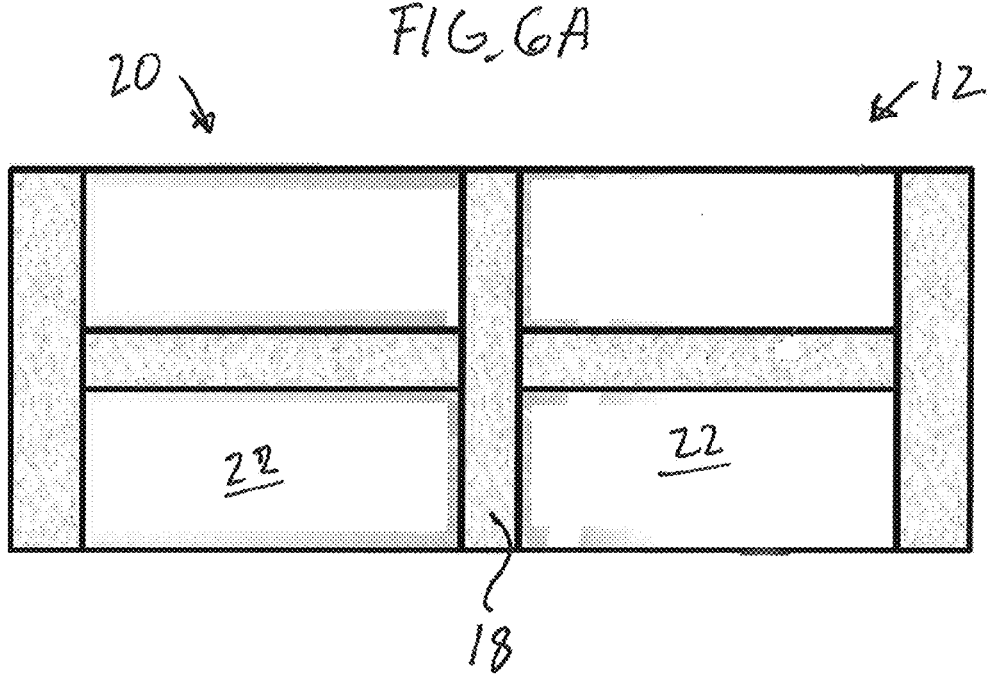
FIG. 6A is a schematic top view of a tubular hydrocarbon adsorption trap having subtraps.

FIG. 6A is a schematic top view of the tubular hydrocarbon adsorption trap 12 (for example, see FIG. 1) showing the compressed, welded region 18 dividing the tubular body 20 into two or more subtraps 22. Hydrocarbon vapor adsorbent media 42 is arranged in the subtraps 22 and generally not present in the dividing top/bottom weld or separating weld 18 between the subtraps. The dividing weld 18 is preferably an ultrasonic or heat bond weld compressing and weldably closing the media sheet 24 such that there is a closed separation or partition provided between the subtraps 22.

Figure 6B:
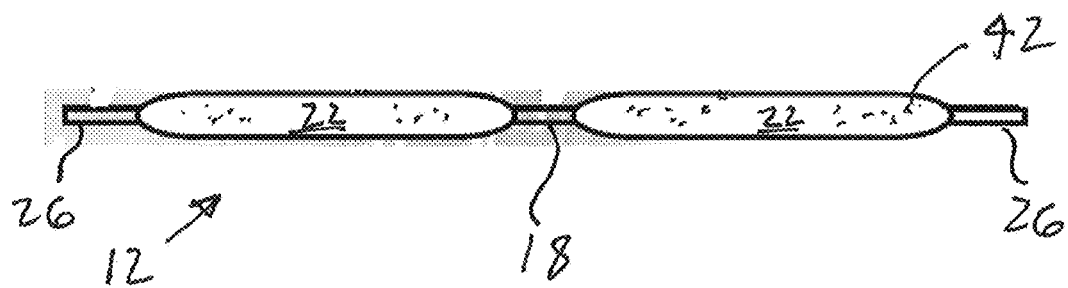
FIG. 6B is a schematic side view of the tubular hydrocarbon adsorption trap of FIG. 6A.

FIG. 6B is a schematic side view of the tubular hydrocarbon adsorption trap 12 of FIG. 6A, providing a better showing of the compressed, welded region 18 dividing the tubular body 20 into two or more subtraps 22. Each subtrap 22 is filled with the hydrocarbon vapor adsorbent media 42, either loosely or the hydrocarbon vapor adsorbent media granules may be bound together by an adhesive so as to maintain an evenly distributed arrangement of the hydrocarbon vapor adsorbent media 42 within the subtraps 22 and the tubular hydrocarbon adsorption trap 12. More clearly shown are the flat mounting tabs members 26 formed by the compressed bottom/top edge welds 16, which may also be structured for strength as shown and discussed with FIG. 1.

As generally seen in FIG. 6B, the opposing longitudinal edges 14 of the media sheet forming the tubular body 20 are secured together, preferably by ultrasonic welding or heat bonding, forming the longitudinal weld 14 along the axial length of the tubular body 20 of the tubular hydrocarbon adsorption trap 12. In an aspect of the invention, as after the tubular shape is formed by welding or heat bonding opposing media sheet edges 14, opposing sides of the rolled media sheet 24 of the tubular hydrocarbon adsorption trap 12 may be compressed together and welded together by ultrasonic welding or heat bonding to form the compressed, welded region 18 dividing the tubular body 20 into two or more subtraps 22.

FIG. 7 depicts a plan view of an exemplary frame member 44 adapted to supportively receive and mount the elongated rolled sheet tubular hydrocarbon adsorption trap 10,12 within the air intake system of filter housing. In FIG. 7, the frame member 44 includes a generally rectangular base plate 46 having open spaces or apertures 48 extending therethrough. For support the generally rectangular base plate 46 may include one or more support members 50 secured to and bridging across open spaces 48 between opposing sides of the frame member 44. A containment wall 52 maybe arranged in and extending generally perpendicularly outwardly from the generally rectangular base 46, the containment wall 52 preferably encloses a hydrocarbon adsorption trap installation space 54 therein on the generally rectangular base 46. It is to be understood that the base plate need not be rectangular in shape, but may be any shape, for example circular, triangular, hexagonal, etc. The base plate is not required to be flat, but may be curved or bent to a desired shape to fit in an intended installation space within the air intake tract.

FIG. 8 depicts a plan view of the exemplary frame member 44 of FIG. 7 in which the tubular hydrocarbon adsorption trap 12 having subtraps 22 is received into the hydrocarbon adsorption trap installation space 54 and supportively mounted on the frame member 44. The frame member 44 may include one or more mounting tabs 56 secured thereon and in the example for FIGS. 6 and 7, the mounting tabs extending outward from the generally rectangular base 46 of the frame member 44 in a directly substantially traverse to the plane of the generally rectangular base 46. The mounting tabs 56 preferably including at least one through hole 58 for receiving heat stakes, screws or other mounting means to secure the frame member 44 within the air intake system.

Figure 9:
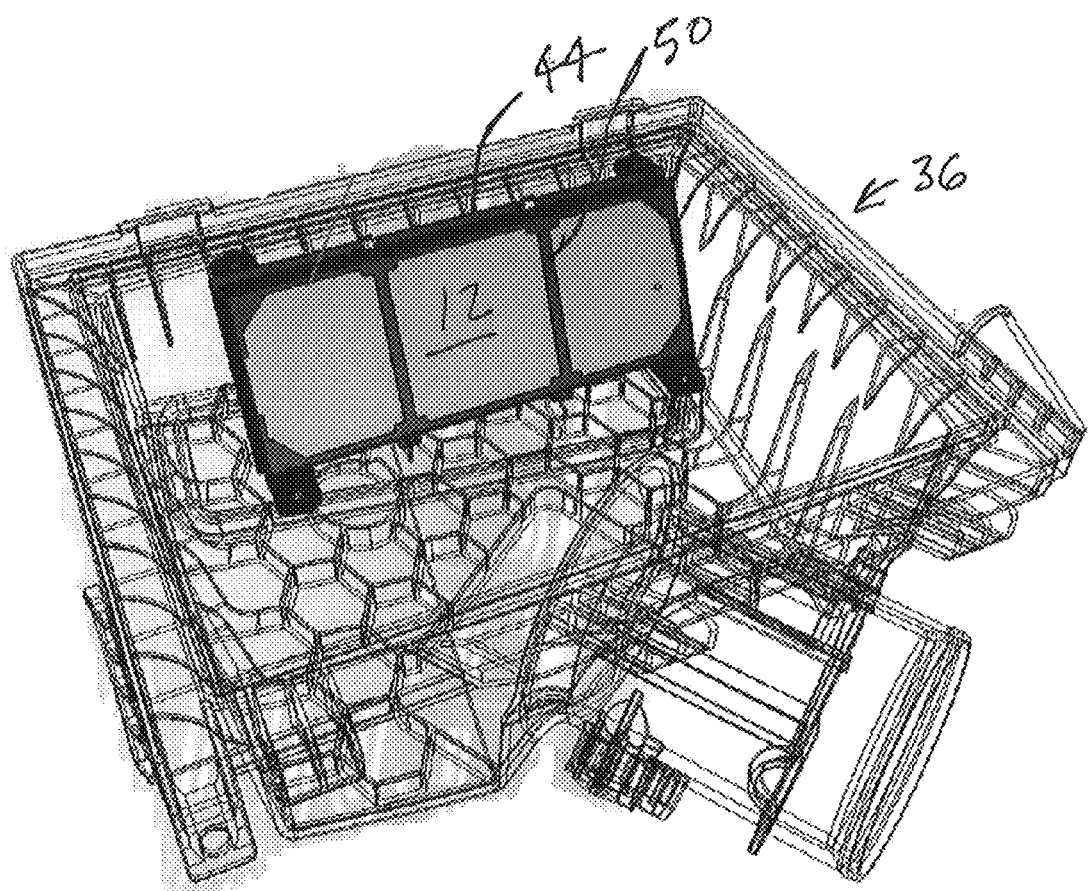
FIG. 9. depicts a perspective view of the tubular hydrocarbon adsorption trap mounted within an air cleaner housing.

FIG. 9. depicts a perspective view of the tubular hydrocarbon adsorption trap 12 mounted to the frame member 44 as in FIG. 8 and secured by heat stakes within the interior of the air filter housing cover 36. As can be seen ion FIG. 9, the support members 50 may be arranged over, contacting and aligned with the compressed, welded regions 18 dividing the tubular body 20 into two or more subtraps 22.

FIG. 10. depicts a perspective view of the exemplary frame member 44 of FIG. 7, showing the support members 50 and secondary support members or pivoting support members 60. The pivoting support members 60 air preferably arranged to overlay the support members 50 at opposing faces of the generally rectangular base plate 46 of the frame member 44. The pivoting support members 60 are flexible along their length permitting an end of the pivoting support members 60 to be deflected or pivoted outwardly from the containment wall 52 to allow installation and possible removal of the tubular hydrocarbon adsorption trap 12 from the frame member 44. A first end of the pivoting support members 60 is secured onto the containment wall 52. An opposing end of the pivoting support members 60 includes a latching means for latchably engaging the opposing wall of the generally rectangular annular containment wall 52. The latching means may include a ring member having an opening and a step member arranged below the ring member, the ring member and the step member secured to the outwardly facing surface the opposing wall of the generally rectangular annular containment wall 52, and positioned to engage an respective one of the pivoting support members 60. The latching means may further include a ramped surface 68 having a step 70 providing one way engagement and latching of the pivoting support members 60 into the opening of the ring member 66 and one way locking engagement of the ramped surface with a step of the pivoting support members 60 with the step member 64 of the containment wall 52. The latching means 62 securely locking the pivoting support members 60 into a closed and engaged position on the generally rectangular annular containment wall 52 and confining and supporting the tubular hydrocarbon adsorption trap 12 within the adsorption trap installation space 54 within the containment wall 52 and between the pivoting support members 60 and the support members 50.

FIG. 11 depict a manufacturing process for producing the elongated circularly wrapped sheet tubular hydrocarbon adsorption trap 10,12. In FIG. 11, a media sheet roll 110 is unspooled into a flat media sheet 112. The flat media sheet 112 is guided, preferably vertically, through forming die plates 114. The forming die plates 114 wrap or form the media sheet 112 into a tubular shape. The opposing lateral edges of the formed tubular shaped sheet are welded together, preferably ultrasonically by sonotrode 118 to form the tubular shape sheet into a circumferentially closed tubular construction. The circumferentially closed tubular construction may be cut to desired lengths by a cutting means such as shear or knife 124, forming a tubular body of a desired longitudinal (axial) length. The cut tubular lengths may then have opposing sides of the tubular sheet compressed together and closed, preferably by ultrasonic welding, such as with sonotrode 120 and anvil 122, such that the open interior of the tubular sheet body is closed at the bottom of the tubular sheet body. The tubular sheet with the closed bottom may then proceed to hydrocarbon adsorption media loading station 126 at which a predetermined volume of hydrocarbon adsorption media is loaded into the open interior of the tubular sheet body. The tubular sheet body may then proceed along path A to have the opposing or top sides of the tubular sheet compressed together and closed, preferably by ultrasonic welding, such as with sonotrode 128 and anvil 130, such that the open interior of the tubular sheet body is closed at the top of the tubular sheet body, thereby fixedly enclosing the hydrocarbon adsorption media within the elongated rolled sheet tubular hydrocarbon adsorption trap 10.

Alternately, after the hydrocarbon adsorption media loading station 126, the closed bottom tubular sheet body with the closed bottom may then proceed on path B to be provided with a compressed, welded region 18 dividing the tubular body 20 into two or more subtraps 22, such as by ultrasonic welding by sonontrode 132 and anvil 134. At this point the lower subtrap 136 has an interior filled with and fully enclosed by the formed media sheet. The upper subtrap 138 has an open upper end. Hydrocarbon adsorption media loading station 140 loads a predetermined volume of hydrocarbon adsorption media into the upper subtrap 138. Then opposing sides of the tubular sheet at the upper end of the upper subtrap 138 may be compressed together and closed, preferably by ultrasonic welding, such as with sonotrode 142 and anvil 144, such that the open interior of the upper subtrap 138 is closed at the top of the tubular sheet body, thereby fixedly enclosing the hydrocarbon adsorption media within the upper subtrap 138 of the elongated rolled sheet tubular hydrocarbon adsorption trap 12.

The above process is illustrated as discrete stations only for ease of understanding. The illustrated process and stations in FIG. 11 may not actually be separate stations, but may be combined into fewer or even a single station. For one example, functions of hydrocarbon adsorption media loading stations 126 and 140 may be performed in a single station using shared or commonly shared sonontrodes and filling means.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as critical, required, or essential features or elements of any or all the claims. The invention is defined solely by the appended claims including any amendments made during the pendency of this application and all equivalents of those claims as issued.

The invention claimed is:

1. A tubular hydrocarbon adsorption trap for adsorption of evaporated fuel vapors within an air intake tract of an internal combustion engine, comprising:
 a hydrocarbon vapor adsorbent media;
 a fuel vapor permeable thermally weldable porous media sheet;
 wherein the media sheet is circularly wrapped to form a circumferentially closed elongated tubular body having at least one interior chamber in which the hydrocarbon vapor adsorbent media is arranged;
 wherein opposing longitudinal edges of the wrapped media sheet are secured together to securely close the circumference of the elongated tubular body;
 wherein axially spaced top and bottom ends of the wrapped media sheet are each securely closed by compressing radially opposing sides of the tubular sheet together at the sheet edges and sealably securing the compressed sheet edges together to close the top and bottom of the tubular body;
 wherein the fuel vapor permeable porous media of the circumferentially closed wrapped tubular sheet body with closed top and bottom has pores sized to retain the hydrocarbon vapor adsorbent media within the tubular body of the hydrocarbon adsorption trap;

wherein the top and bottom ends of the tubular body are securely closed by compression together of radially opposing sides of the media sheet at the top and bottom edges and thermal welding or ultrasonic welding of the media sheet to close the top and bottom edges by edge welds;

the hydrocarbon adsorption trap further comprising:
a frame member, including:
a base plate member, the base plate member have at least open aperture extending therethrough;
at least one elongated support member having opposing ends secured to the base plate member, the at least one elongated support member forming a partition separating the at least open aperture and supporting the circumferentially closed elongated tubular body with the hydrocarbon vapor adsorbent media therein;
at least one secondary support member secured directly or indirectly to the base plate member, the at least one secondary support member arranged to align with the at least one elongated support member and at a spacing thereto;
wherein the supporting the circumferentially closed elongated tubular body is arranged in a gap between overlaying ones of the at least one elongated support member and the at least one secondary support member.

2. The hydrocarbon adsorption trap according to claim 1, wherein
the hydrocarbon vapor adsorbent media includes activated carbon granules.

3. The hydrocarbon adsorption trap according to claim 2, wherein
the granules are bound together by an adhesive, the adhesive maintaining the granules in a desired spaced distribution within the at least one interior chamber of the wrapped tubular body.

4. The hydrocarbon adsorption trap according to claim 1, wherein
the media sheet comprises any of: a polyester material, a non-woven polyester, a polyester felt or a cellulose material.

5. The hydrocarbon adsorption trap according to claim 1, wherein
the interior chamber of the wrapped tubular body is divided into at least two subtrap chambers;
wherein the at least two subtrap chambers are formed by compression and thermal welding or ultrasonic welding of the media sheet at an axial location between the top and bottom edges forming at least one compressed dividing region, the thermal welding or ultrasonic welding region dividing the interior chamber of the tubular body into the at least two subtrap chambers.

6. The hydrocarbon adsorption trap according to claim 1, wherein
the edge welds at the top and bottom of the tubular body are compressed substantially flat mounting tabs for mounting the tubular hydrocarbon adsorption trap within the intake tract.

7. The hydrocarbon adsorption trap according to claim 6, wherein
the mounting tabs have a 3D structured surface of raised ribs and depressions;
wherein the structured surface is provided by embossing or thermal forming;
wherein the structured surface provides rigidity and strength to the mounting tabs of the tubular body.

8. The hydrocarbon adsorption trap according to claim 1, further comprising:
a containment wall arranged on and extending generally perpendicularly outwardly from the base plate member, the containment wall, base plate member, at least one elongated support member and the least one secondary support member defining an installation space into which the circumferentially closed elongated tubular body is arranged and supported;
wherein the at least one secondary support member secured at opposing ends to the containment wall.

9. The hydrocarbon adsorption trap according to claim 8, wherein
the at least one secondary support member is at least one pivoting support member, the at least one secondary support member secured at a first end to the containment wall, the at least one secondary support member including a latching means at an opposing second end, the latching means of the at least one secondary support member engaging a cooperating latching means on the containment wall to latchably secure the second end of the at least one secondary support member in a close position on the containment wall;
wherein the at least one pivoting support member, when not latchably engaged, is deflectable outwardly from the base plate member to permit installation of the circumferentially closed elongated tubular body into the installation space.

10. The hydrocarbon adsorption trap according to claim 8, wherein
the at least one elongated support member and the least one secondary support member are aligned to contact the circumferentially closed elongated tubular body on the at least one dividing region.

* * * * *